(12) United States Patent
Park

(10) Patent No.: US 10,091,233 B2
(45) Date of Patent: Oct. 2, 2018

(54) METHOD AND APPARATUS FOR CONTROLLING FUNCTIONALITY USING CODES

(71) Applicant: ELECTRONICS AND TELECOMMUNICATIONS RESEARCH INSTITUTE, Daejeon (KR)

(72) Inventor: Su-Wan Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 186 days.

(21) Appl. No.: 15/167,329

(22) Filed: May 27, 2016

(65) Prior Publication Data

US 2017/0201546 A1 Jul. 13, 2017

(30) Foreign Application Priority Data

Jan. 7, 2016 (KR) .................. 10-2016-0002169

(51) Int. Cl.
*H04L 29/06* (2006.01)
*G06F 8/61* (2018.01)
*H04W 12/08* (2009.01)
*G06F 9/445* (2018.01)

(52) U.S. Cl.
CPC ............ *H04L 63/1441* (2013.01); *G06F 8/61* (2013.01); *H04L 63/20* (2013.01); *H04W 12/08* (2013.01); *G06F 9/44505* (2013.01)

(58) Field of Classification Search
CPC .. H04L 63/1441; H04L 63/20; H04W 12/108; G06F 8/61; G06F 9/44505
USPC ....... 726/1, 5, 6, 27, 28; 713/168, 182, 184; 455/410, 411
See application file for complete search history.

(56) References Cited

U.S. PATENT DOCUMENTS

| 8,391,232 | B2 | 3/2013 | Ko et al. |
| 8,489,095 | B2 | 7/2013 | Oh et al. |
| 8,679,748 | B2 | 3/2014 | Briska |
| 2007/0087733 | A1* | 4/2007 | Gerlach .................. H04M 3/51 455/418 |
| 2011/0191252 | A1* | 8/2011 | Dai ........................ G06Q 20/10 705/71 |

(Continued)

FOREIGN PATENT DOCUMENTS

| KR | 10-0631580 B1 | 10/2006 |
| KR | 10-2013-0013459 A | 2/2013 |

*Primary Examiner* — Aravind K Moorthy

(57) ABSTRACT

Disclosed herein are a method and apparatus for controlling functionality of a mobile device. The operation of the element function of the mobile device is blocked by a blocking code, and the operation of the blocked element function is unblocked by an unblocking code. The blocking code is a code used to block the operation of the element function of the mobile device in an area in which a user is located, and the unblocking code is a code that is uniquely generated to correspond to the blocking code and that is used to unblock the operation of the blocked element function. By means of the blocking code and the unblocking code, the blocking and unblocking of the operation of an element function that is required in an area in which the user of the mobile device is located may be easily performed.

17 Claims, 11 Drawing Sheets

(56) References Cited

U.S. PATENT DOCUMENTS

| | | | | |
|---|---|---|---|---|
| 2012/0005213 A1* | 1/2012 | Hannan | ............... | G06Q 30/02 707/741 |
| 2013/0051378 A1* | 2/2013 | Gruberman | ............ | H04W 8/245 370/338 |
| 2013/0115972 A1* | 5/2013 | Ziskind | ............... | H04W 4/02 455/456.2 |
| 2014/0099923 A1* | 4/2014 | Kalderen | ............. | H04W 12/12 455/411 |
| 2014/0113592 A1* | 4/2014 | Wu | ............... | G06F 21/44 455/411 |
| 2014/0230040 A1* | 8/2014 | Crowther | ............. | H04W 4/021 726/10 |
| 2014/0364099 A1* | 12/2014 | Pai | ............... | H04L 63/08 455/418 |
| 2016/0034699 A1* | 2/2016 | Sasaki | ............. | G06F 21/6218 726/27 |
| 2016/0306514 A1* | 10/2016 | McKeithan, II | ...... | G06F 3/0484 |

* cited by examiner

METHOD AND APPARATUS FOR CONTROLLING FUNCTIONALITY USING CODES

CROSS REFERENCE TO RELATED APPLICATION

This application claims the benefit of Korean Patent Application No 10-2016-0002169, filed Jan. 7, 2016, which is hereby incorporated by reference in its entirety into this application.

BACKGROUND OF THE INVENTION

1. Technical Field

The following embodiments generally relate to a method and apparatus for controlling the functionality of a mobile device and, more particularly, to a method and apparatus for controlling functionality based on codes.

2. Description of the Related Art

The use of mobile devices has exponentially increased in the enterprise. The wide propagation of mobile devices and the advancement of the functionality thereof also serve to increase the misuse and abuse of mobile devices. In particular, when mobile devices are capable of directly accessing enterprise resources, such access may pose a serious risk to enterprise security. Therefore, controlling access by mobile devices to enterprise resources has great importance.

In a specific area included in an enterprise (or a company), some specific functions of mobile devices may be prohibited. For example, the operation of a camera function, the sending of messages, the sending of emails, the use of a network, etc. may result in the leakage of data, and thus the operation may be prohibited if the consent of a manager in an enterprise is not obtained. In spite of this restriction, a user may manipulate his or her mobile device so as to activate a prohibited function in a specific area.

To solve the above-described problem, companies need to consider new and sophisticated methods for managing mobile devices based on various device models, platforms, and operating systems.

Meanwhile, when the functions of mobile devices are prohibited in a specific area in conformity with the policies of an enterprise, the users of such mobile devices require the control of the functions of the mobile devices to be simplified. Further, the users of the mobile devices are expected to securely release the prohibited functions.

As conventional technology for controlling the functionality of a mobile device, Korean Patent No. 10-0631580 is presented.

SUMMARY OF THE INVENTION

An embodiment is to provide an apparatus and method that allow the user of a mobile device to more easily control the functionality of the mobile device using codes. Such control may include the blocking and unblocking of a specific function of the mobile device.

Another embodiment is to provide an apparatus and method that allow the user of a mobile device to recognize that a code has been correctly transmitted to the mobile device and that the functionality of the mobile device is being controlled.

A further embodiment is to provide an apparatus and method that can prevent sensitive data from being leaked through a procedure for recognizing that the functionality of a mobile device is being controlled.

Yet another embodiment is to provide an apparatus and method that efficiently block a specific function of a mobile device and unblock the blocked function.

Still another embodiment is to provide an apparatus and method that block a specific function of a mobile device and unblock the blocked function, thus preventing the leakage of sensitive enterprise data and blocking the spreading of malicious data into the mobile device.

In accordance with an aspect of the present invention, there is provided a method for controlling functionality of a mobile device, the method being performed by the mobile device, including blocking an operation of at least one element function of the mobile device using a blocking code; and unblocking the operation of the at least one blocked element function using an unblocking code.

The unblocking code may be generated to be unique to the mobile device or a user of the mobile device.

The method may further include installing an application on the mobile device.

Each of the blocking code and the unblocking code may be input by a user of the mobile device through the application.

Blocking the operation may include transmitting a blocking request including the blocking code to a server; receiving a response indicating whether to block the operation of the at least one element function from the server; and blocking the operation of the at least one element function when the response indicates that verification of the blocking code has succeeded.

Unblocking the operation may include transmitting an unblocking request for the blocking to a server; receiving a response indicating whether to perform unblocking from the server; and unblocking the operation using an unblocking code included in the response when the response indicates that the unblocking is permitted.

In accordance with another aspect of the present invention, there is provided a mobile device, including a user interface (UI) input device for receiving a blocking code from a user; a communication unit for receiving an unblocking code from a server; and a processing unit for blocking an operation of at least one element function of the mobile device using the blocking code, and unblocking the operation of the at least one blocked element function using the unblocking code.

In accordance with a further aspect of the present invention, there is provided a method for controlling functionality of a mobile device, the method being performed by a server, including blocking an operation of at least one element function of the mobile device using a blocking code transmitted from the mobile device; and unblocking the operation of the blocked element function using an unblocking code.

The blocking code may be a code used by the mobile device to block the operation of the at least one element function in an area in which a user is located.

The area may be a building.

The blocking code may be configured such that different blocking codes are used for multiple areas.

The area may be a building of an institution that operates the server.

The server may generate the unblocking code to be unique to the mobile device or a user of the mobile device.

Blocking the operation may include receiving a blocking request including the blocking code from the mobile device; verifying the blocking code; and transmitting a response generated based on a result of the verification to the mobile device, the response indicating whether to block the operation of the at least one element function corresponding to the blocking code.

The blocking request may further include user information that is information about a user of the mobile device.

Verifying the blocking code may be performed by analyzing the user information and the blocking code.

The user information may include a user identifier.

Verifying the blocking code may include determining whether the blocking code matches a purpose of a visit of the user, recorded on the server using the user identifier.

The user information may include information about a position of the mobile device.

Verifying the blocking code may include determining whether the blocking code matches the position.

Blocking the operation may further include generating the unblocking code using a combination of the user information and the blocking code.

Unblocking the operation may include receiving an unblocking request for the blocking from the mobile device; determining whether to permit the unblocking; and transmitting a response indicating whether to perform the unblocking based on a result of the determination to the mobile device.

The request may include information about a position of the mobile device.

Determining whether to permit the unblocking may include determining whether the position is in an area appropriate for the unblocking.

The method may further include providing an alarm to the mobile device when the blocking code is not transmitted from the mobile device.

In addition, other methods, apparatuses, and systems for implementing the present invention, and a computer-readable storage medium storing a computer program for executing the method, are further provided.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
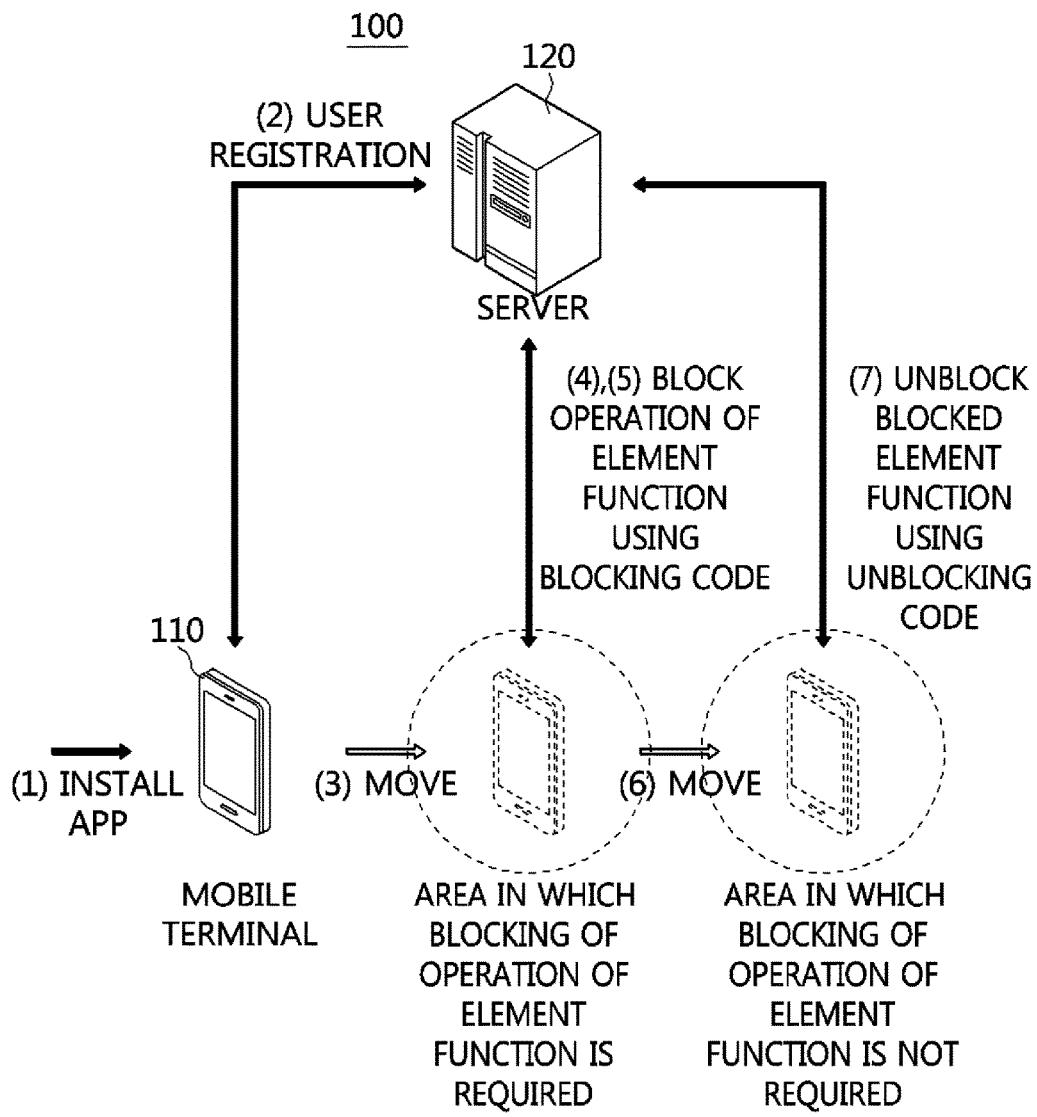
FIG. 1 illustrates the operation of a system for controlling the functionality of a mobile device using codes according to an embodiment.

Detailed description of the following exemplary embodiments will be made with reference to the attached drawings illustrating specific embodiments. These embodiments are described so that those having ordinary knowledge in the technical field to which the present disclosure pertains can easily practice the embodiments. It should be noted that various embodiments are different from each other, but do not need to be mutually exclusive to each other. For example, specific shapes, structures, and characteristics described here may be implemented as other embodiments without departing from the spirit and scope of the embodiments in relation to an embodiment. Further, it should be understood that the locations or arrangement of individual components in each disclosed embodiment can be changed without departing from the spirit and scope of the embodiments. Therefore, the accompanying detailed description is not intended to restrict the scope of the disclosure, and the scope of exemplary embodiments is limited only by the accompanying claims, along with equivalents thereof, as long as they are appropriately described.

In the drawings, similar reference numerals are used to designate the same or similar functions in various aspects. The shapes, sizes, etc. of components in the drawings may be exaggerated to make the description clear.

The terms used in the embodiments are for the purpose of describing particular embodiments only and are not intended to be limiting of the present invention. As used herein, the singular forms are intended to include the plural forms as well, unless the context clearly indicates otherwise. It will be further understood that the terms "comprises," "comprising, ", "includes" and/or "including," when used herein, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element, or intervening elements may be present.

Terms such as 'first' and 'second' may be used to describe various elements, but the elements are not restricted by the terms. The terms are used only to distinguish one element from the other element. For example, a first element may be named a second element without departing from the scope of the present invention. Likewise, a second element may be named a first element.

Also, elements described in the embodiments of the present invention are independently shown in order to indicate different characteristic functions, and but this does not mean that each of the elements is formed of a separate piece of hardware or software. That is, elements are arranged and included, for convenience of description, and at least two of the elements may form one element or one element may be divided into multiple elements and the multiple elements may perform functions. An embodiment into which the elements are integrated or an embodiment from which some elements are separated is included in the scope of the present invention as long as it does not depart from the essence of the present invention.

Further, in the present invention, some elements are not essential elements for performing essential functions, but may be optional elements for improving only performance. The present invention may be implemented using only essential elements for implementing the essence of the present invention, excluding elements used to improve only performance, and a structure including only essential elements, excluding optional elements used only to improve performance, is included in the scope of the present invention.

Embodiments of the present invention are described with reference to the accompanying drawings in order to describe the present invention in detail so that those having ordinary knowledge in the technical field to which the present invention pertains can easily practice the present invention. In the following description of the present invention, detailed descriptions of known functions and configurations which are deemed to make the gist of the present invention obscure will be omitted.

FIG. 1 illustrates the operation of a system for controlling the functionality of a mobile device using codes according to an embodiment.

A system 100 may include a mobile device 110 and a server 120.

The mobile device 110 may denote a device that operates based on a network, such as a mobile phone, a smartphone, a tablet, a notebook, or a personal computer (PC).

The mobile device 110 may be manipulated by the user thereof. The server 120 may be operated by an institution.

The system 100 may block the operation of a predetermined element function among the functions of the mobile device 110 within a predetermined area, for example, the building of the institution. Further, when a predetermined condition is satisfied, the system 100 may unblock the operation of the blocked element function. Such blocking and unblocking may be implemented using codes assigned to the user of the mobile device 110.

In FIG. 1, the operations performed by the system may be divided into (1) to (6).

(1) The user may install an application (App) on the mobile device 110.

The App may be a security App, which may be an App that is required in order to control the element function of the mobile device 110.

The App may control the element function of the mobile device 110 while operating in conjunction with the server 120.

The mobile device 110 may download the App from the server 120 and may install the downloaded App on the mobile device 110.

(2) The user may perform user registration for service. The user may register himself or herself in the server 120 using the mobile device 110. Through user registration, the server 120 may assign a user identification code to the user.

A database (DB) stored in the server 120 may manage both user information, provided by the user to perform user registration, and the user identification code assigned to the user.

For example, when the user visits an institution, he or she is required to mandatorily install an App on the mobile device 110 and to be mandatorily assigned a user identification code according to the policy of the institution.

(3) When the installation of the App and the user registration have been completed, the user may move to a specific area while carrying the mobile device 110. For example, the specific area may be the building of the institution.

A blocking code may be assigned to the area. The blocking code may be a code for blocking the operation of at least one element function of the mobile device 110.

For example, a messaging function blocking code for blocking the messaging function of the mobile device 110 may be assigned to the building of the institution, and a camera function blocking code for blocking the camera function of the mobile device 110 may be assigned thereto.

(4) The user may block the operation of a specific element function of the mobile device 110 using a blocking code. Here, the specific element function may be an element function which is prohibited from being used in the area to which the user has moved.

The user may input a blocking code through the App installed on the mobile device 110. When the blocking code is input, the App may block the operation of the element function corresponding to the blocking code. In other words, the user may block some of various functions of the mobile device 110 by simply inputting the code through the App.

(5) When the blocking code is input, the mobile device 110 may transmit the input blocking code to the server 120. The server 120 may verify the blocking code transmitted from the mobile device 110. Further, the server 120 may transmit a response indicating the blocking of the element function to the mobile device 110 so that the element function of the mobile device 110 is blocked. The mobile device 110, having received the response, may block the element function corresponding to the blocking code.

(6) The user may move again to another area in which the blocking of the operation of the element function is not required.

(7) When the user moves to the other area and thus departs from the specific area in which the blocking of the operation of the element function is required, the user may request an unblocking code from the server 120 through the App installed on the mobile device 110. The unblocking code may be a code for unblocking the operation of the at least one blocked element function of the mobile device 110. The user may input the unblocking code received from the server 120 through the App. When the unblocking code is input, the mobile device 110 may unblock the operation of the at least one blocked element function.

Figure 2:
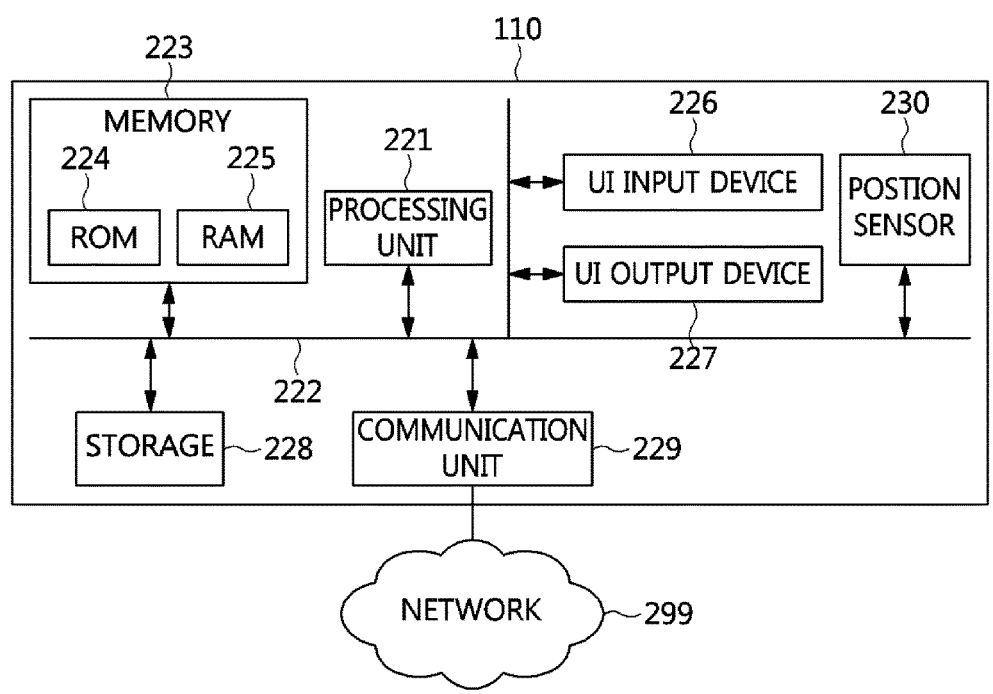
FIG. 2 is a configuration diagram of a mobile device according to an embodiment.

FIG. 2 is a configuration diagram of a mobile device according to an embodiment.

As shown in FIG. 2, the mobile device 110 may include a processing unit 221, memory 223, a User Interface (UI) input device 226, a UI output device 227, and storage 228, which communicate with each other through a bus 222.

The processing unit 221 may include at least one processor. The processing unit 221 may be a semiconductor device for executing processing instructions stored in the memory 223 or the storage 228. The processing unit 221 may process tasks required to operate the mobile device 110. The processing unit 221 may execute codes in the operations or steps of the processing unit 221, which will be described in the following embodiments.

Each of the memory 223 and the storage 228 may be any of various types of volatile or nonvolatile storage media. For example, the memory 223 may include at least one of Read Only Memory (ROM) 224 and Random Access Memory (RAM) 225. The memory 223 and the storage 228 may store data required for the operation of the mobile device 110.

The UI input device 226 may be a touch screen. The UI output device 227 may be a display.

The mobile device 110 may further include a communication unit 229 connected to a network 299. The communication unit 229 may receive data or information required for the operation of the mobile device 110, and may transmit data or information required for the operation of the mobile device 110. The communication unit 229 may transmit data to another device in the network 299 and may receive data from another device. For example, the communication unit 229 may be a network chip or port.

The mobile device 110 may further include a position sensor 230. The position sensor 230 may be a global positioning system (GPS) sensor. The position sensor 230 may generate information indicating the position of the mobile device 110.

The processing unit 221 may execute an App. The processing unit 221 may execute the code of the App. The processing unit 221 may install the App in the memory 223 and/or the storage 228. The communication unit 229 may transmit data, provided by the App, to the server 120, or may provide the data, received from the server 120, to the App, in response to the request of the App.

Figure 3:
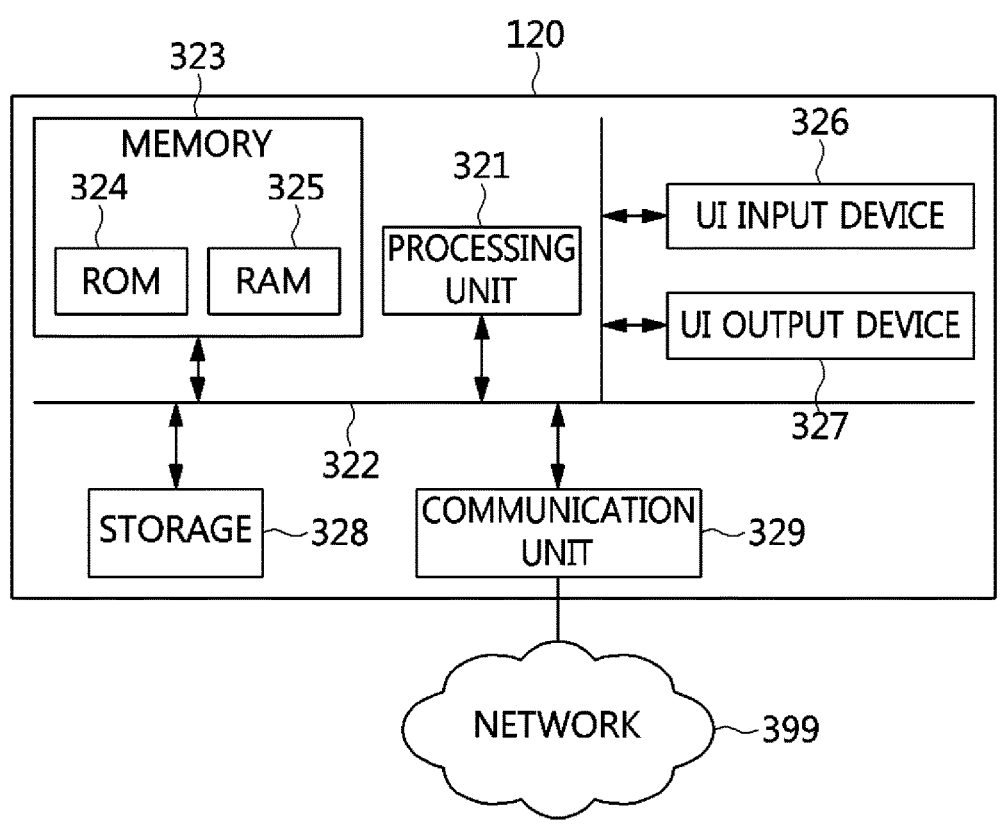
FIG. 3 is a configuration diagram of a server according to an embodiment.

FIG. 3 is a configuration diagram of a server according to an embodiment.

As shown in FIG. 3, the server 120 may include a processing unit 321, memory 323, a UI input device 326, a UI output device 327, and storage 328, which communicate with each other through a bus 322.

The processing unit 321 may include at least one processor. The processing unit 321 may be a semiconductor device for executing processing instructions stored in the memory 323 or the storage 328. The processing unit 321 may process tasks required for the operation of the server 120. The processing unit 321 may execute codes in the operations or steps of the processing unit 321 which will be described in the following embodiments.

Each of the memory 323 and the storage 328 may be any of various types of volatile or nonvolatile storage media. For example, the memory may include at least one of ROM 324 and RAM 325. The memory 323 and the storage 328 may store data required for the operation of the server 120. The storage 328 may include a DB.

The UI input device 326 may be a touch screen. The UI output device 327 may be a display.

The server 120 may further include a communication unit 329 connected to a network 399. The communication unit 329 may receive data or information required for the operation of the server 120, and may transmit data or information required for the operation of the server 120. The communication unit 329 may transmit data to another device in the network 399 and may receive data from the other device. For example, the communication unit 329 may be a network chip or port.

The network 299 of the mobile device 110, described above with reference to FIG. 2, and the network 399 of the server 120 may be the same network, or may be connected to each other.

Figure 4:
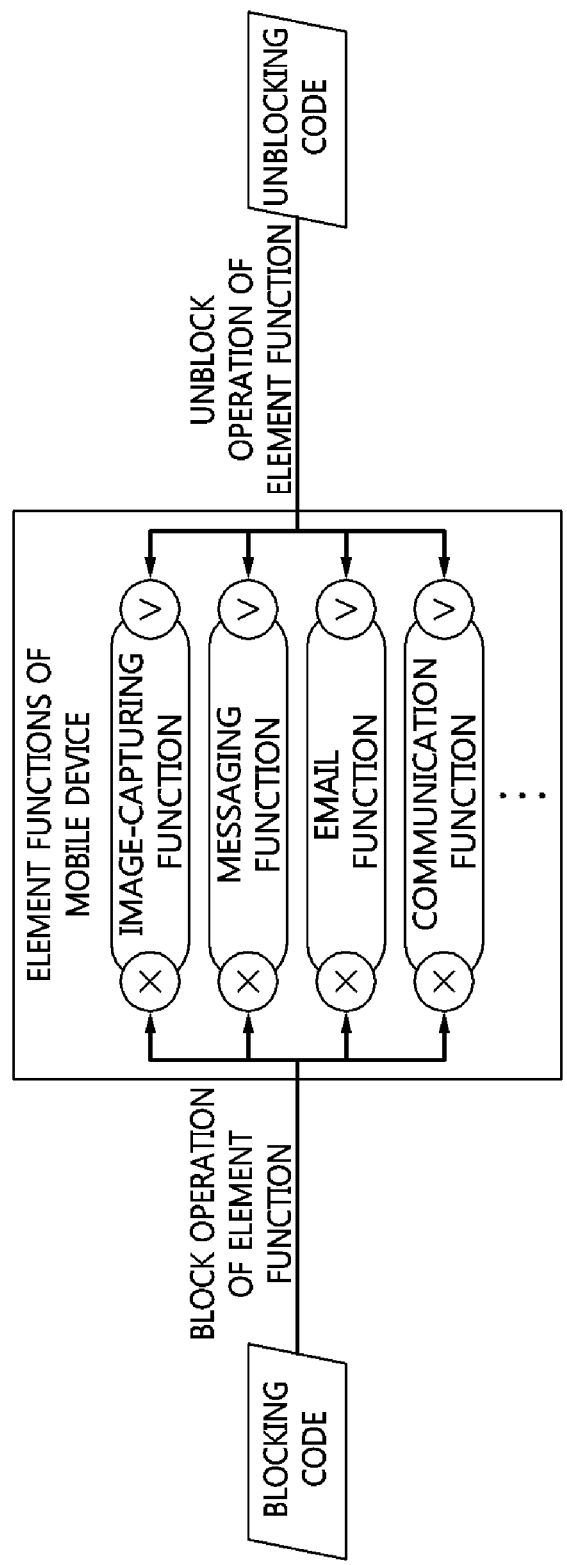
FIG. 4 illustrates functions of a blocking code and an unblocking code according to an example.

FIG. 4 illustrates the functions of a blocking code and an unblocking code according to an example.

A blocking code may be used to block the operation of at least one element function of the mobile device 110. For example, a single blocking code may be used to block the operations of multiple element functions of the mobile device 110.

The blocking code may be a code that is used by the mobile device 110 to block the operation of at least one element function of the mobile device 110 in an area in which the user of the mobile device 110 is located.

The element functions may include an image-capturing function using the camera of the mobile device 110, a messaging function, an email function, and a communication function. Also, the communication function may include a wireless communication function, a Bluetooth communication function, a Universal Serial Bus (USB) communication function, etc.

The unblocking code may be used to unblock the at least one element function of the mobile device 110, the operation of which has been blocked using the blocking code.

By means of the blocking code and the unblocking code, the specific element function of the mobile device may be easily and efficiently controlled. For example, when the operation of at least one element function of the mobile device 110 is required to be temporarily blocked in order to access a certain area, the user of the mobile device 110 may block the operation of at least one element function and unblock the operation of the blocked element function by utilizing only the blocking code and the unblocking code, without personally manipulating the setting or configuration of the mobile device 110.

The blocking code may be a numeric string or an alphanumeric string. The unblocking code may also be a numeric string or an alphanumeric string. For example, each of the blocking code and the unblocking code may be a specific number.

The blocking code may be generated by the server 120 or by an institution that operates the server 120. The blocking code may be determined for each element function, independent of the user. For example, when the blocking of the same element function is required for multiple users, the same blocking code may be used by the multiple mobile devices. Similarly, when the blocking of the same element function is required for multiple mobile devices, the same blocking code may be used by the multiple mobile devices.

The blocking codes may differ from each other depending on the institution that operates the server 120 or the area in which the blocking code is used. For example, even if the blocking of the same element function is required for multiple institutions that operate servers, the blocking codes used to block the element function may be different from each other for respective institutions. Similarly, even if the blocking of the same element function is required for multiple areas, the blocking codes used to block the element function may be different from each other for respective areas.

Blocking codes may also be generated by the server 120. The server 120 may provide different blocking codes for individual mobile devices 110 or users using information about the various mobile devices 110 or various users.

The server 120 may provide different blocking codes and unblocking codes for respective users when user registration is performed. Blocking codes and unblocking codes may be unique values assigned to respective users upon user registration. For example, the server 120 may provide different blocking codes for respective users using user identifiers or visiting times, which are included in the user information.

For example, blocking codes may be different from each other for 1) respective institutions that operate the servers 120, 2) respective areas in which blocking codes are used, and 3) respective mobile devices 110 or respective users of the mobile devices 110. Therefore, the blocking codes may be prevented from being shared by multiple mobile devices or multiple users.

Unblocking codes may be generated by the server 120. The server 120 may generate unblocking codes so that they are unique to the mobile devices 110 or to the users of the mobile devices 110. In other words, each unblocking code may be a code that is uniquely used to unblock the operation of the at least one blocked element function of a single specific mobile device 110. When the operations of element functions of multiple mobile devices are blocked, unblocking codes required to unblock the operations of the blocked element functions of the multiple mobile devices may be different from each other for respective mobile devices 110.

Since the unblocking codes are different from each other for respective mobile device 110 or for respective users of the mobile devices 110, it is possible to prevent the operations of the element functions from being unblocked using known unblocking codes without obtaining unblocking codes via the server 120.

The unblocking codes are mandatorily required to be unique to mobile devices 110 or to the users of the mobile devices 110 in order to execute the following embodiments. Because the unblocking codes are unique to individual users, it is possible to prevent the operations of the element functions from being unblocked via arbitrary manipulation by the users.

In the interest of user convenience, a blocking code and an unblocking code may be applied to multiple element functions. In other words, a blocking code may block the operation of a group of element functions. An unblocking code may unblock the operation of the blocked group of element functions.

For example, when both the messaging function and the camera function of the mobile device 110 must be blocked in a certain building, a single blocking code for blocking both the functions may be used, and a single unblocking code for unblocking the blocked functions may be used. By means of a single unique unblocking code, the operations of the blocked multiple element functions may be unblocked.

Each institution may use different policies for respective areas related to the institution. The institution or the server 120 of the institution may determine at least one group of element functions that must be blocked in each area. The institution or the server 120 of the institution may use a blocking code, for blocking the operation of at least one element function corresponding to each group, and an unblocking code, for unblocking the operation of the at least one blocked element function for each group.

Figure 5:
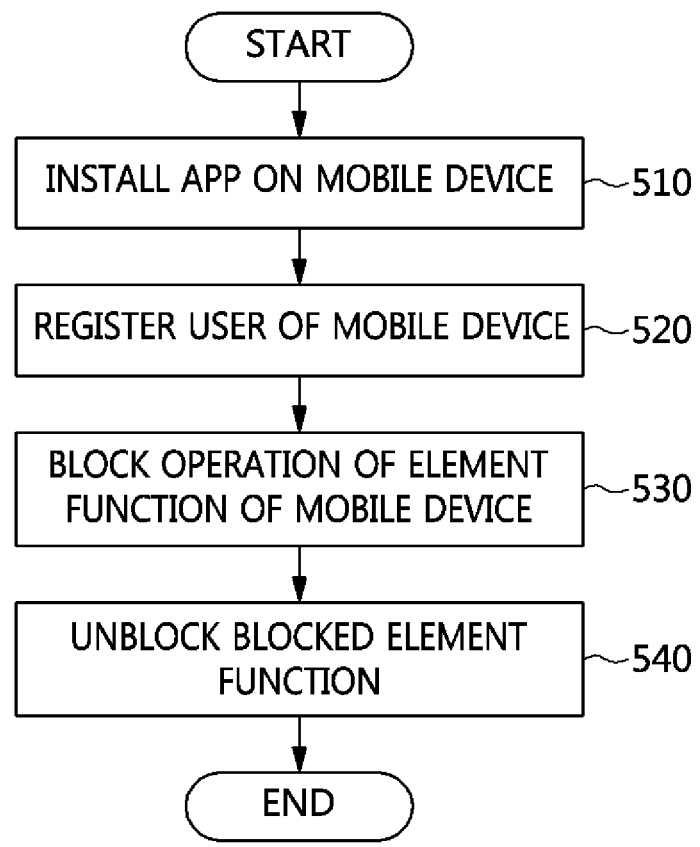
FIG. 5 is a flowchart showing the method by which a mobile device controls the functionality of the mobile device using a blocking code and an unblocking code according to an embodiment.

FIG. 5 is a flowchart showing a method by which a mobile device controls the functionality of the mobile device using a blocking code and an unblocking code according to an embodiment.

At step 510, the processing unit 221 of the mobile device 110 may install an application (App) on the mobile device 110.

The institution that manages the operation server 120 may restrict the mobile device 110 so that, before the user of the mobile device 110 visits the building of an institution, the App is mandatorily installed on the mobile device 110.

The App may be a security App for the use of a blocking code and an unblocking code. Each of the blocking code and the unblocking code, which will be described later, may be input through the App by the user of the mobile device 110.

At step 520, the processing unit 221 may perform user registration for the user of the mobile device 110.

The institution that operates the server 120 may restrict the mobile device 110 such that user registration is mandatorily performed before the user of the mobile device 110 visits the building of the institution.

At step 530, the processing unit 221 may block the operation of at least one element function of the mobile device 110 using a blocking code.

At step 540, the processing unit 221 may unblock the operation of the at least one blocked element function using an unblocking code.

The interoperation between the mobile device 110 and the server 120 will be described in detail below. Further, in relation to the interoperation, steps 510, 520, 530, and 540 will be described in detail below.

Figure 6:
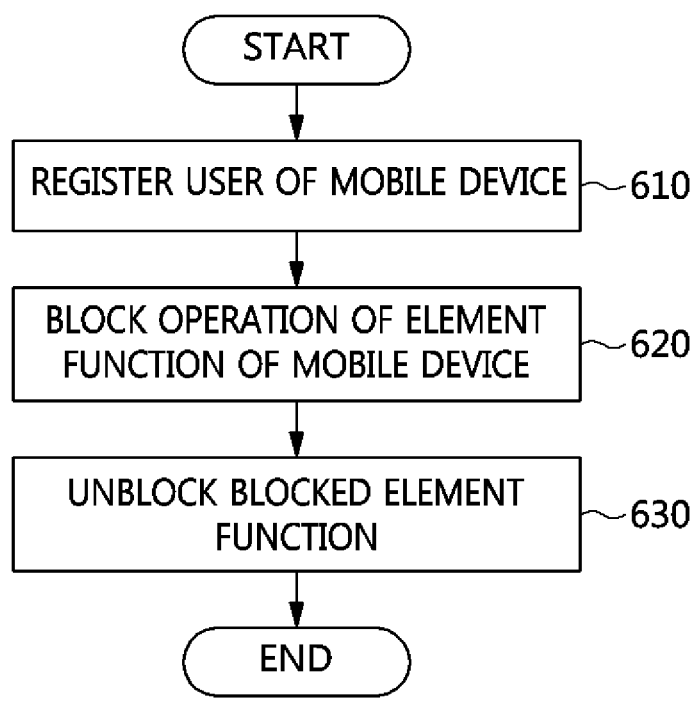
FIG. 6 is a flowchart showing the method by which a server controls the functionality of a mobile device using a blocking code and an unblocking code according to an embodiment.

FIG. 6 is a flowchart showing the method by which the server controls the functionality of the mobile device using a blocking code and an unblocking code according to an embodiment.

At step 610, the processing unit 321 of the server 120 may perform user registration for the user of the mobile device 110.

At step 620, the processing unit 321 of the server 120 may block the operation of at least one element function of the mobile device 110 using a blocking code transmitted from the mobile device 110.

At step 630, the processing unit 321 of the server 120 may unblock the operation of the at least one blocked element function of the mobile device 110 using an unblocking code.

Interoperation between the mobile device 110 and the server 120 will be described in detail below. Further, in relation to the interoperation, steps 610, 620, and 630 will be described in detail below, respectively.

Figure 7:
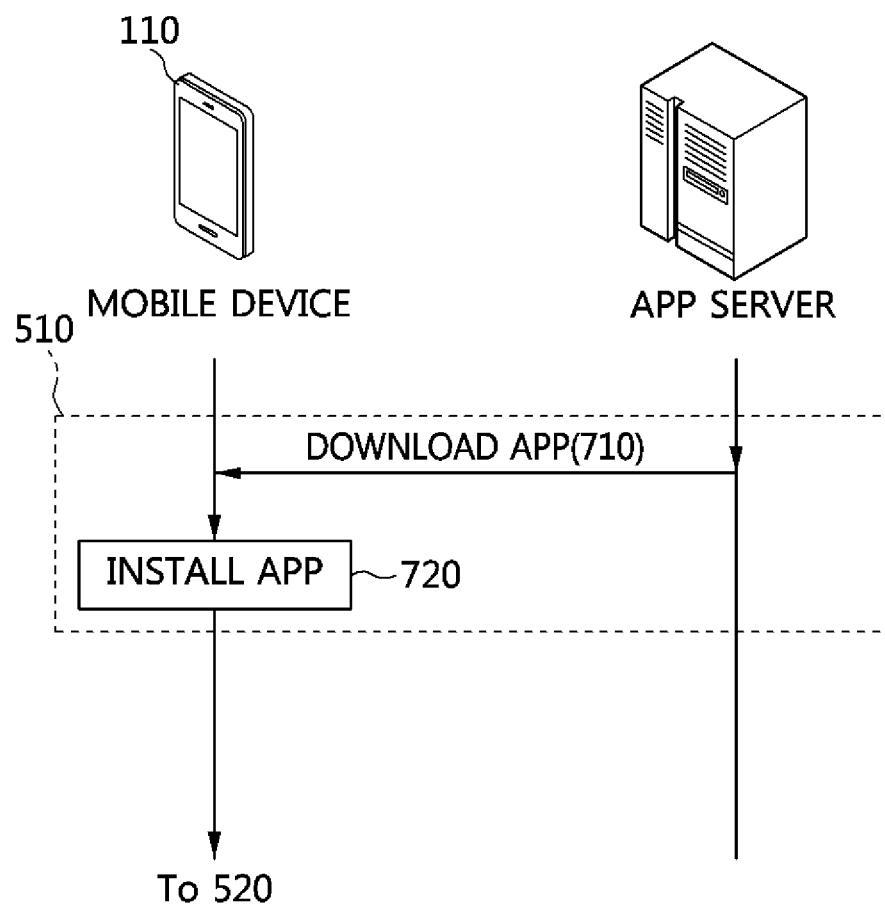
FIG. 7 is a flowchart showing the method for installing an application according to an embodiment.

FIG. 7 is a flowchart showing a method for installing an App according to an embodiment.

Step 510, described above with reference to FIG. 5, may include the following steps 710 and 720.

At step 710, the communication unit 229 of the mobile device 110 may download an App from an App server.

The App server may be a server for providing the App. The App server may be the server 120.

At step 720, the processing unit 221 of the mobile device 110 may install the downloaded App.

Figure 8:
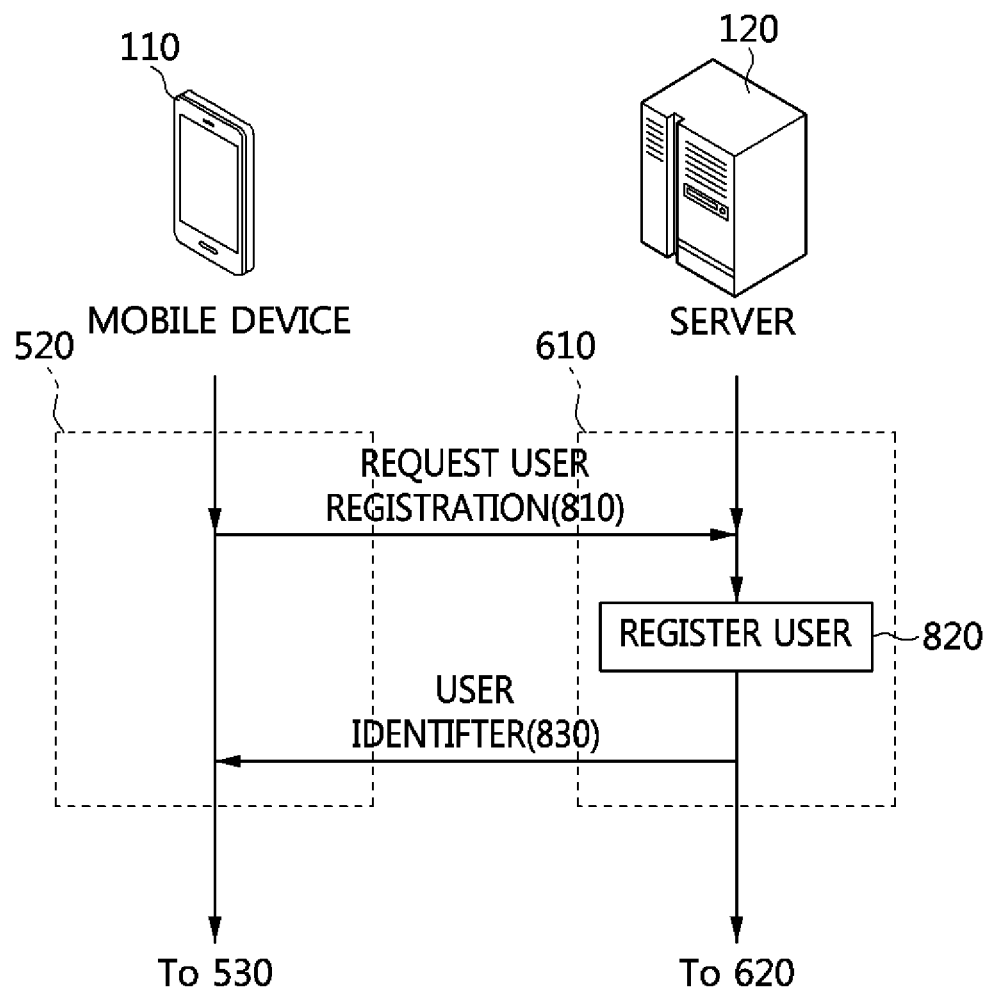
FIG. 8 is a flowchart showing a user registration procedure according to an embodiment.

FIG. 8 is a flowchart showing a user registration procedure according to an example.

Step 520, described above with reference to FIG. 5, may include the following steps 810 and 830. Step 610, described above with reference to FIG. 6, may include the following steps 810, 820, and 830.

At step 810, the communication unit 229 of the mobile device 110 may transmit a user registration request to the communication unit 329 of the server 120. The communication unit 329 of the server 120 may receive the user registration request from the communication unit 229 of the mobile device 110.

The user registration request may include information about the user of the mobile device 110. The user information may be information about the user of the mobile device 110.

The user registration request may include the purpose and time of the visit of the user.

At step 820, the processing unit 321 of the server 120 may perform user registration for the user.

The processing unit 321 of the server 120 may store the user information and information about the purpose and time of the visit of the user in the storage 328. The user information and the visit purpose and time information may be managed in the storage 328.

The processing unit 321 of the server 120 may generate an identifier for the user.

At step 830, the communication unit 329 of the server 120 may transmit the user identifier to the communication unit 229 of the mobile device 110. The communication unit 229 of the mobile device 110 may receive the user identifier from the communication unit 329 of the server 120.

Figure 9:
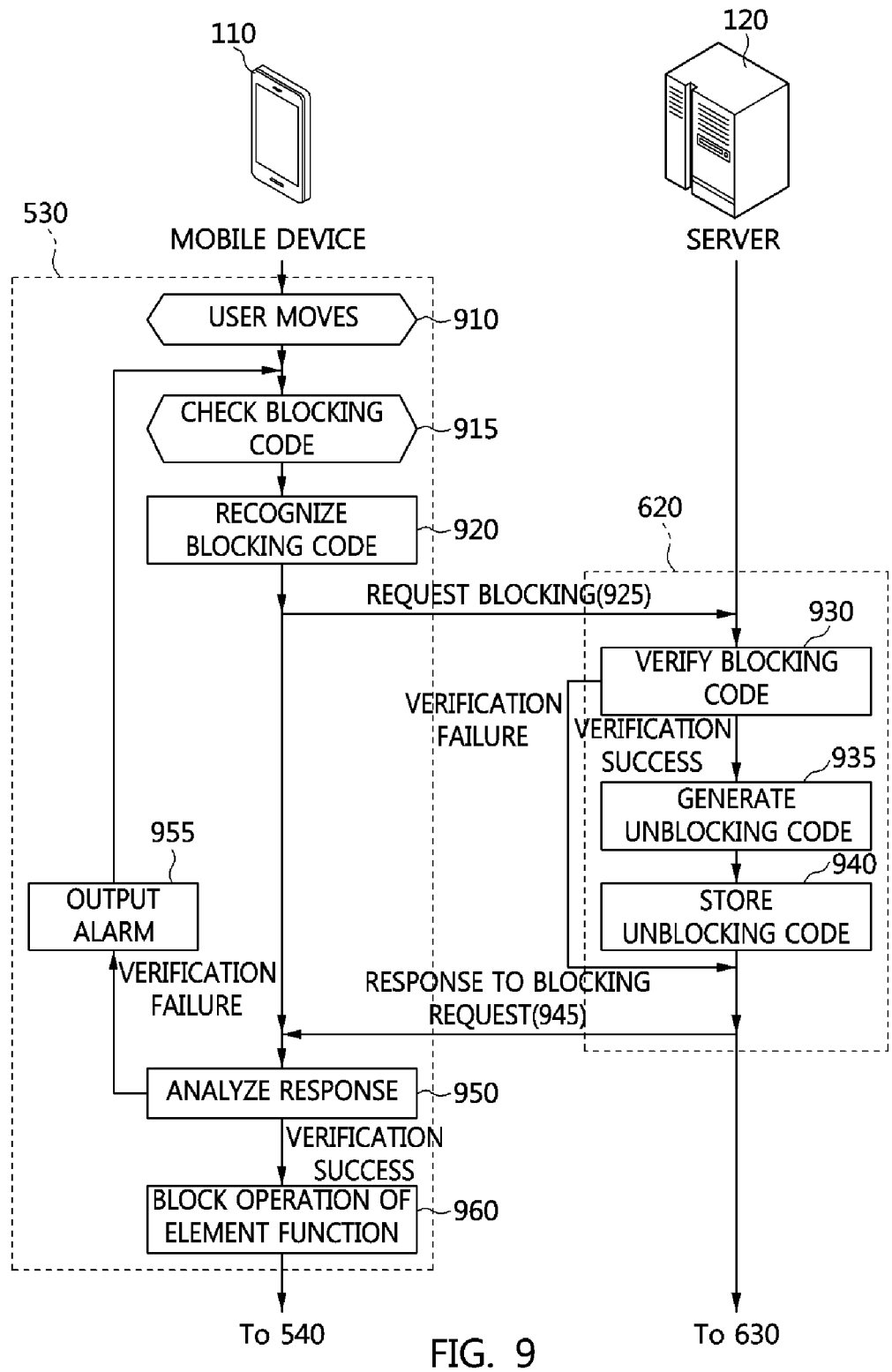
FIG. 9 is a flowchart showing the blocking of the operation of an element function that uses a blocking code according to an embodiment.

FIG. 9 is a flowchart showing the blocking of the operation of an element function that uses a blocking code according to an embodiment.

Step 530, described above with reference to FIG. 5, may include the following steps 915, 920, 925, 945, 950, 950, and 960. Further, step 620, described above with reference to FIG. 6, may include the following steps 925, 930, 935, 940, and 945.

When the App is installed in the mobile device 110 and the registration of the user of the mobile device 110 has been completed, the operation of an element function that uses a blocking code may be blocked at the following steps 910, 915, 920, 925, 930, 935, 940, 945, 950, 955, and 960. In other words, the blocking of the operation of the element function that uses the blocking code, which will be described later, may be provided based on the environment in which the App is installed on the mobile device 110 and user registration is completed.

At step 910, the user of the mobile device 110 may move to a certain area.

For example, the area may be a building. The area may be the building of the institution that operates the server 120.

In the area to which the user has moved, the operation of at least one predefined element function, among the element functions of the mobile device 110, may be required to be blocked in conformity with the policy or the like of the institution. To block the operation of the element function, the following steps 915, 920, 925, 930, 935, 940, 945, 950, 955, and 960 may be performed.

At step 915, the user of the mobile device 110 may check an element function blocking item and a blocking code corresponding to the area in which the user is located.

For example, an indicator board located in the area may indicate an element function blocking item and a blocking code.

For example, when the user moves to the area, the communication unit 229 of the mobile device 110 may receive a predefined signal. With the reception of the predefined signal, the processing unit 221 of the mobile device 110 may output both the element function blocking item and the blocking code via the UI output device 227.

The element function blocking item may refer to the element function of the mobile device 110 that is to be blocked in the area. The element function blocking item may be determined in conformity with the policy of the institution that operates the server 120. Owing to the element function blocking item, the user may know which element functions cannot be used in the area in which the user is located.

The blocking code may be a code for blocking the element function corresponding to the element function blocking item, among the element functions of the mobile device 110.

In accordance with an embodiment, only a blocking code may be provided to the user, without providing an element function blocking item. Since only the blocking code is provided to the user, the operation of a required element function may be blocked without the user actually recognizing which one of the element functions of the mobile device 110 is blocked by the blocking code.

At step 920, the processing unit 221 of the mobile device 110 may recognize the input of the blocking code.

For example, the user of the mobile device 110 may input the blocking code to the mobile device 110. The UI input device 226 of the mobile device 110 may recognize the blocking code input by the user. The user of the mobile device 110 may input the blocking code through the installed App.

Alternatively, the UI input device 226 of the mobile device 110, for example, may recognize the blocking code. The blocking code may be displayed in the form of an image or a symbol, and the UI input device 226 of the mobile device 110 may recognize the displayed blocking code.

Alternatively, the communication unit 229 of the mobile device 110, for example, may receive the blocking code through the signal transferred over a wired/wireless network.

At step 925, the communication unit 229 of the mobile device 110 may transmit a blocking request including the blocking code to the communication unit 329 of the server 120. The communication unit 329 of the server 120 may receive the blocking request including the blocking code from the communication unit 229 of the mobile device 110.

The blocking request may further include user information. The user information may include a user identifier and information about the position of the mobile device 110.

The user identifier may be a mobile device identifier, which is the identifier of the mobile device 110 itself. For example, the user identifier may be an International Mobile Equipment Identity (IMEI). Alternatively, the user identifier may be an identifier (temporarily) issued by the server 120.

At step 930, the processing unit 321 of the server 120 may verify the blocking code.

The processing unit 321 may verify the blocking code through the analysis of both the user information and the blocking code. The processing unit 321 may verify whether the transmitted blocking code is appropriate by analyzing both the user information and the blocking code.

For example, verification of the blocking code may include determining, using the user identifier, whether the blocking code matches the purpose of the visit of the user, which is recorded on the server 120. The processing unit 321 may determine, using the user identifier, whether the blocking code matches the purpose of the visit of the user recorded on the server 120.

For example, verification of the blocking code may include determining whether the blocking code matches the position of the mobile device. The processing unit 321 may determine, using information about the position of the mobile device 110, whether the blocking code matches the position of the mobile device 110.

When the verification of the blocking code succeeds, step 935 may be performed. In contrast, when the verification of the blocking code fails, step 945 may be performed.

At step 935, the processing unit 321 of the server 120 may generate an unblocking code corresponding to the blocking code.

The unblocking code corresponding to the blocking code may be a code for unblocking the operation of at least one blocked element function of the mobile device 110, for the at least one element function. The unblocking code may be a unique code that enables the operation of the blocked element function of the mobile device 110 to be unblocked.

The processing unit 321 may generate an unblocking code using a combination of the user information and the blocking code. For example, the processing unit 321 may generate a combination value by combining a user identifier, a visit time, the phone number of the user, etc., and may generate all or part of the unblocking code by applying a hashing or Message Authentication Code (MAC) algorithm to the combination value.

At step 940, the processing unit 321 may store the unblocking code in the storage 328. The processing unit 321 may store the unblocking code and blocking information together in the storage 328. The blocking information may indicate at least one element function, the operation of which is blocked by the blocking code. In other words, the blocking information may indicate at least one element function, the blocked operation of which is to be unblocked by the unblocking code.

At step 945, the communication unit 329 of the server 120 may transmit a response to the blocking request to the communication unit 229 of the mobile device 110. The communication unit 229 of the mobile device 110 may receive a response to the blocking request from the communication unit 329 of the server 120.

The response to the blocking request may be generated based on the result of the verification at step 930. The response to the blocking request may indicate whether to block the operation of at least one element function of the mobile device 110 corresponding to the blocking code.

The response may indicate that verification of the blocking code has succeeded or has failed.

At step 950, the processing unit 221 of the mobile device 110 may analyze the response transmitted from the server 120.

When the response indicates that verification of the blocking code has failed, step 955 may be performed. When the response indicates that verification of the blocking code has succeeded, step 960 may be performed.

At step 955, the processing unit 221 of the mobile device 110 may output an alarm through the UI output device 227. The alarm may be a warning message indicating that verification of the blocking code has failed. The alarm may be an error in the input blocking code, and may indicate the re-input of the blocking code.

To re-input the blocking code, step 915 may be repeated.

At step 960, when the response indicates that verification of the blocking code has succeeded, the processing unit 221 of the mobile device 110 may block the operation of at least one element function corresponding to the blocking code.

The blocking of the operation of the at least one element function may be performed by the App.

As described above, the user may control the operation of the element function, which is required to be blocked, merely by inputting the blocking code.

Figure 10:
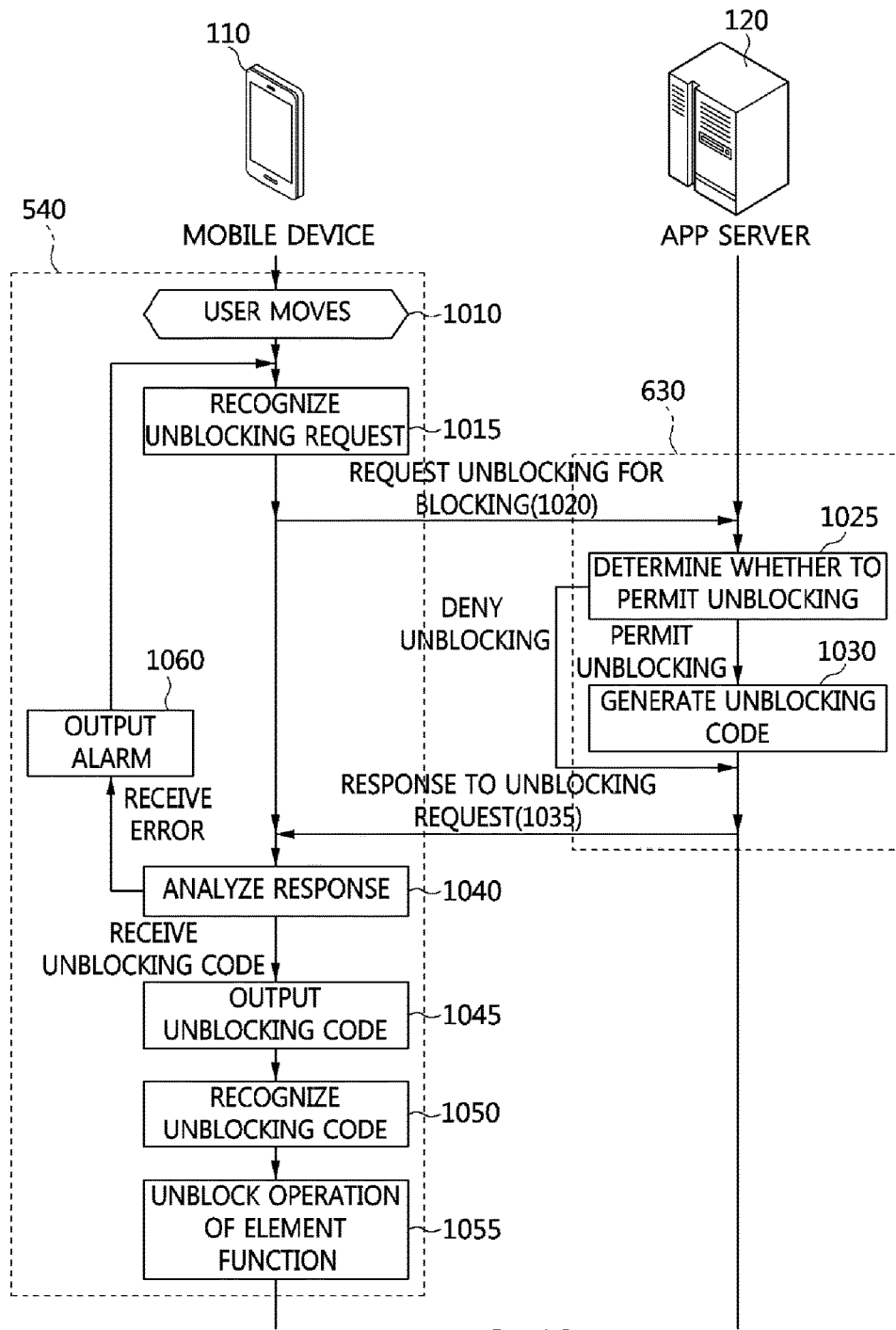
FIG. 10 is a flowchart showing the unblocking of the operation of an element function that uses an unblocking code according to an embodiment.

FIG. 10 is a flowchart showing the unblocking of the operation of an element function that uses an unblocking code according to an embodiment.

Step 540, described above with reference to FIG. 5, may include the following steps 1010, 1015, 1020, 1035, 1040, 1045, 1050, 1055, and 1060. Further, step 630, described above with reference to FIG. 6, may include the following steps 1020, 1025, 1030, and 1035.

In the embodiment described above with reference to FIG. 9, the operation of at least one element function of the mobile device 110 is blocked.

At step 1010, the user of the mobile device 110 may depart from the area in which the operation of the element function is required to be blocked. When the user departs from the area in which the operation of the element function is required to be blocked, the operation of the blocked element function needs to be resumed. To unblock the blocked element function, the following steps 1015, 1020, 1025, 1030, 1035, 1040, 1045, 1050, 1055 and 1060 may be performed.

At step 1015, the processing unit 221 of the mobile device 110 may recognize an unblocking request.

For example, the user of the mobile device 110 may input an unblocking request to the mobile device 110. The UI input device 226 of the mobile device 110 may recognize the unblocking request input by the user. The user may request unblocking through the App installed on the mobile device 110.

Alternatively, the UI input device 226 of the mobile device 110 may recognize that unblocking is possible. For example, the communication unit 229 of the mobile device 110 may recognize that unblocking is possible through the signal transferred over the wired/wireless network.

At step 1020, the communication unit 229 of the mobile device 110 may transmit an unblocking request to the communication unit 329 of the server 120. The communication unit 329 of the server 120 may receive the unblocking request from the communication unit 229 of the mobile device 110.

The unblocking request may further include user information. The user information may include a user identifier and information about the position of the mobile device 110.

At step 1025, the processing unit 321 of the server 120 may determine whether to permit the unblocking. The processing unit 321 may determine whether to permit the unblocking using the user information.

For example, the determination of whether to permit the unblocking may include determining whether the mobile device 110 is in an area appropriate for unblocking. The processing unit 321 may check, using information about the position of the mobile device 110, whether the position of the mobile device 110 is appropriate for unblocking. The processing unit 321 may determine, using the information about the position of the mobile device 110, whether the mobile device 110 is in a place where the operation of at least one element function of the mobile device 110 is not required to be blocked. When the mobile device 110 is in a place where the operation of at least one element function of the mobile device 110 is not required to be blocked, the processing unit 321 may determine that unblocking is permitted. When the mobile device 110 is in a place where the operation of at least one element function of the mobile device 110 is required to be blocked, the processing unit 321 may determine that unblocking is not permitted.

If it is determined that unblocking is permitted, step 1030 may be performed. If it is determined that unblocking is not permitted, step 1035 may be performed.

At step 1030, the processing unit 321 of the server 120 may generate an unblocking code.

For example, the processing unit 321 of the server 120 may determine an unblocking code. The processing unit 321 of the server 120 may search the storage 328 for the unblocking code stored at step 940, described above with reference to FIG. 9.

At step 1035, the communication unit 329 of the server 120 may transmit a response to the unblocking request to the communication unit 229 of the mobile device 110. The communication unit 229 of the mobile device 110 may receive the response to the unblocking request from the communication unit 329 of the server 120.

The response to the unblocking request may indicate whether to perform unblocking. The processing unit 321 of the server 120 may generate the response to the unblocking request based on the result of the determination at step 1025.

When the response to the unblocking request indicates that unblocking is permitted, the response to the unblocking request may include an unblocking code. The communication unit 229 of the mobile device 110 may receive the unblocking code from the communication unit 329 of the server 120.

When the response to the unblocking request indicates that unblocking is not permitted, the response to the unblocking request may indicate that an error has occurred.

At step 1040, the processing unit 221 of the mobile device 110 may analyze the response to the unblocking request.

When the unblocking code is received in the response to the unblocking request, step 1045 may be performed. When an error is received in the response to the unblocking request, step 1060 may be performed.

At step 1045, the processing unit 221 of the mobile device 110 may output the unblocking code through the UI output device 227.

At step 1050, the processing unit 221 of the mobile device 110 may recognize the input of the unblocking code.

For example, the user of the mobile device 110 may input the unblocking code to the mobile device 110. The UI input device 226 of the mobile device 110 may recognize the unblocking code input by the user. The user of the mobile device 110 may input the unblocking code through the installed App.

At least some of steps 1045 and 1050 may be omitted. For example, when the unblocking code is received, the processing unit 221 of the mobile device 110 may perform the operation corresponding to step 1055 using the received unblocking code, without the user's intervention.

At step 1055, when the received response indicates that unblocking is permitted, the processing unit 221 of the mobile device 110 may unblock the operation of the at least one blocked element function of the mobile device 110 using the unblocking code input by the user. By means of unblocking, the at least one element function that has been blocked may be activated again.

The processing unit 221 may determine the element function, the operation of which is to be unblocked by the input unblocking code, and may unblock the operation of the element function corresponding to the input unblocking code.

If the input unblocking code is false or does not correspond to the blocked element function, the processing unit 221 may output an alarm through the UI output device 227. The alarm may be a message indicating that the input unblocking code is false.

At step 1060, the processing unit 221 of the mobile device 110 may output an alarm through the UI output device 227. The alarm may be a warning message indicating that the unblocking of the operation of at least one element function of the mobile device 110 is not permitted.

When step 1060 is performed, step 1015 may be repeated so as to unblock the blocked element function.

The unblocking of the operation of the at least one element function may be performed by the App.

As described above, the user may control the operation of the element function that is required to be blocked or unblocked merely by requesting unblocking and inputting the provided unblocking code.

Figure 11:
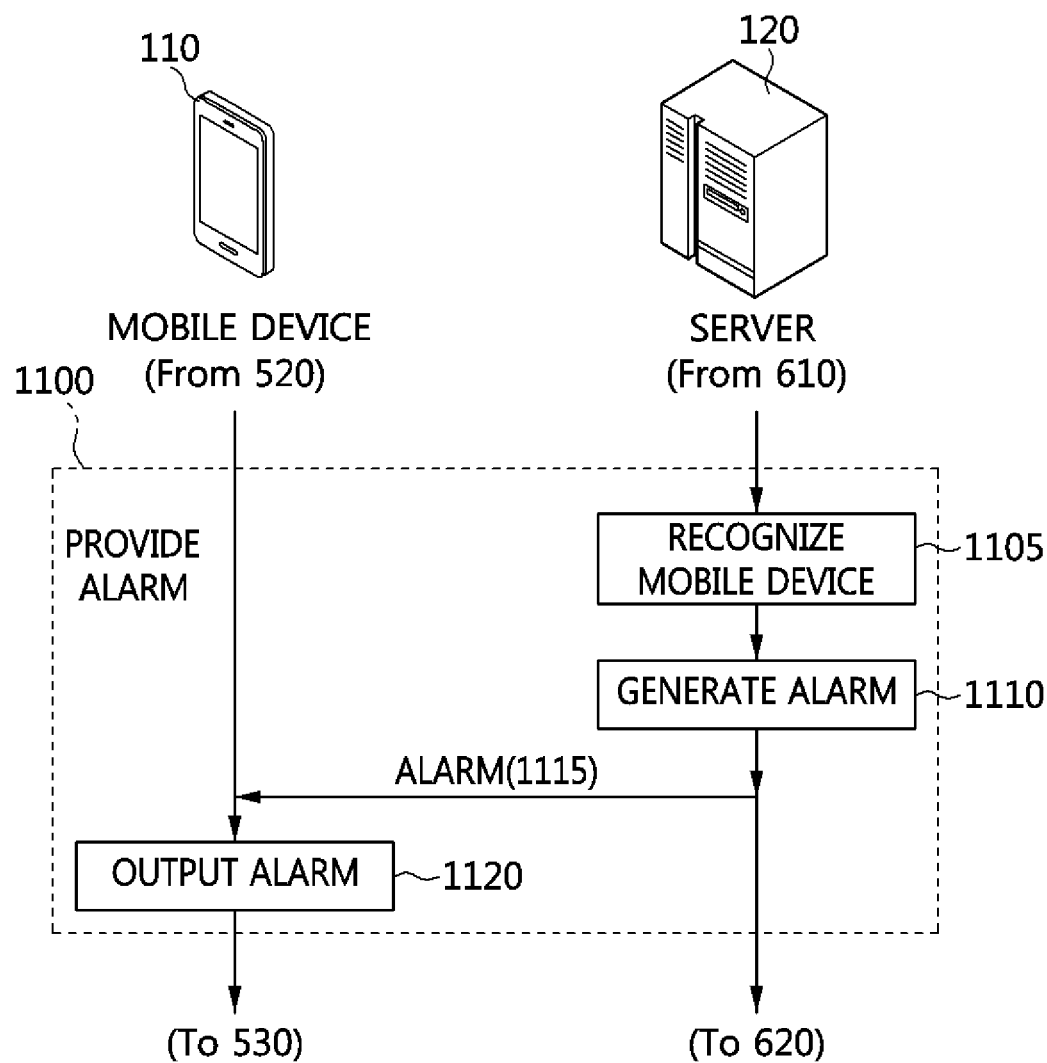
FIG. 11 illustrates a method for providing an alarm to the mobile device when a blocking code is not transmitted according to an embodiment.

FIG. 11 illustrates a method for providing an alarm to the mobile device when a blocking code is not transmitted according to an embodiment.

Step 1100, which will be described later, may be performed by the mobile device 110 and the server 120. For example, the mobile device 110 may perform step 1100 between steps 520 and 530 described above with reference to FIG. 5. The server 120 may perform step 1100 between step 610 and 620, described above with reference to FIG. 6.

Depending on the circumstances, there may be the case where the mobile device 110 may enter an area in which at least one element function is required to be blocked, but the mobile device 110 does not transmit a blocking code to the server 120. In this case, there is a need to provide, through the server 120, a message indicating that the input of a blocking code is required.

At step 1100, when a blocking code is not transmitted from the mobile device 110, the server 120 may provide an alarm to the mobile device 110.

Step 1100 may include steps 1105, 1110, 1115, and 1120.

At step 1105, the processing unit 321 of the server 120 may recognize the mobile device 110.

For example, the processing unit 321 of the server 120 may recognize that the mobile device 110 is located in the area in which the blocking of at least one element function is required. Alternatively, the processing unit 321 may recognize that, even if the mobile device 110 is located in the area in which the blocking of at least one element function is required, a blocking code has not been transmitted within a preset period of time.

At step 1110, the processing unit 321 of the server 120 may generate an alarm indicating that the input or provision of a blocking code is required.

At step 1115, the communication unit 329 of the server 120 may transmit the alarm to the communication unit of the mobile device 110. The communication unit of the mobile device 110 may receive the alarm from the communication unit 329 of the server 120.

At step 1120, the processing unit 221 of the mobile device 110 may output the alarm through the UI output device 227.

At least some of the above-described steps 1105, 1110, 1115, and 1120 may be periodically performed. For example, the server 120 may periodically provide an alarm, indicating that the input or provision of the blocking code is required, to the mobile device 110.

In the above-described embodiments, information about the user may be processed via encryption in the transmission and storage of data. For example, the processing unit 221 of the mobile device 110 and the processing unit 321 of the server 120 may generate encrypted user information by encrypting the user information. The communication unit 229 of the mobile device 110 and the communication unit 329 of the server 120 may transmit or receive the encrypted user information. The processing unit 321 of the server 120 may store the encrypted user information.

By means of the above-described blocking code and unblocking code, the leakage of information through the element function of the mobile device 110 may be easily and securely prevented.

The apparatus described herein may be implemented using hardware components, software components, or a combination thereof. For example, the device and components described in the embodiments may be implemented using one or more general-purpose or special purpose computers, for example, a processor, a controller, an arithmetic logic unit (ALU), a digital signal processor, a microcomputer, a field programmable array (FPA), a programmable logic unit (PLU), a microprocessor or any other device capable of responding to and executing instructions. The processing device may run an operating system (OS) and one or more software applications that run on the OS. The processing device may also access, store, manipulate, process, and create data in response to execution of the software. For convenience of understanding, the use of a single processing device is described, but those skilled in the art will understand that a processing device may comprise multiple processing elements and multiple types of processing elements. For example, a processing device may include multiple processors or a single processor and a single controller. Also, different processing configurations, such as parallel processors, are possible.

The software may include a computer program, code, instructions, or some combination thereof, and it is possible to configure processing devices or to independently or collectively instruct the processing devices to operate as desired. Software and data may be embodied permanently or temporarily in any type of a machine, a component, physical or virtual equipment, a computer storage medium, a device, or in a propagated signal wave in order to provide instructions or data to the processing devices or to be interpreted by the processing devices. The software may also be distributed in computer systems over a network such that the software is stored and executed in a distributed method. In particular, the software and data may be stored in one or more computer readable recording media.

The methods according to the above-described embodiments may be implemented as a program that can be executed by various computer means. In this case, the program may be recorded on a computer-readable storage medium. The computer-readable storage medium may include program instructions, data files, and data structures, either solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine code, such as code created by a compiler, and high-level language code executable by a computer using an interpreter. The hardware devices may be configured to operate as one or more software modules in order to perform the operation of the present invention, and vice versa.

As described above, there are provided an apparatus and method that allow the user of a mobile device to more easily control the functionality of the mobile device using codes. Such control may include the blocking and unblocking of a specific function of the mobile device.

There are provided an apparatus and method that allow the user of a mobile device to recognize that a code has been correctly transmitted to the mobile device and that the functionality of the mobile device is being controlled.

There are provided an apparatus and method that can prevent sensitive data from being leaked through a procedure for recognizing that the functionality of a mobile device is being controlled.

There are provided an apparatus and method that efficiently block a specific function of a mobile device and unblock the blocked function.

There are provided an apparatus and method that block a specific function of a mobile device and unblock the blocked function, thus preventing the leakage of sensitive enterprise data and blocking the spreading of malicious data into the mobile device.

Although the preferred embodiments have been disclosed based on a limited number of embodiments and drawings, those skilled in the art will appreciate that various modifications, additions and substitutions are possible. For example, even if the above-described technologies are performed in a sequence differing from that of the described method, and/or components such as a system, a structure, a device, and a circuit are coupled or combined in a way differing from that of the described method or are replaced with or substituted by other components or equivalents, suitable results can be achieved.

What is claimed is:

1. A method for controlling functionality of a mobile device, the method being performed by the mobile device, comprising:
   transmitting a blocking request including the blocking code to a server;
   blocking an operation of at least one element function of the mobile device using a blocking code; and
   unblocking the operation of the at least one blocked element function using an unblocking code received from a remote server,
   wherein unblocking code is a combination of user information and the blocking code.

2. The method of claim 1, wherein the unblocking code is generated to be unique to the mobile device or a user of the mobile device.

3. The method of claim 1, further comprising installing an application on the mobile device,
   wherein the blocking code is input by a user of the mobile device through the application.

4. The method of claim 1, wherein blocking the operation comprises:
   receiving a response indicating whether to block the operation of the at least one element function from the server; and
   blocking the operation of the at least one element function when the response indicates that verification of the blocking code has succeeded.

5. The method of claim 1, wherein unblocking the operation comprises:
   transmitting an unblocking request for the blocking to a server;
   receiving a response indicating whether to perform unblocking from the server; and
   unblocking the operation using an unblocking code included in the response when the response indicates that the unblocking is permitted.

6. A mobile device, comprising:
   a user interface (UI) input device for receiving a blocking code from a user;
   a communication unit for receiving an unblocking code from a server; and
   a processing unit for blocking an operation of at least one element function of the mobile device using the blocking code, and unblocking the operation of the at least one blocked element function using the unblocking code,
   wherein the blocking operation includes:
   receiving a blocking request including the blocking code from the mobile device, the blocking code including user information about a user of the mobile device;
      verifying the blocking code by analyzing the user information and the blocking code; and
      transmitting a response generated based on a result of the verification to the mobile device, the response indicating whether to block the operation of the at least one element function corresponding to the blocking code, and
   wherein the unblocking code comprises a combination of the user information and the blocking code.

7. A method for controlling functionality of a mobile device, the method being performed by a server, comprising:

blocking an operation of at least one element function of the mobile device using a blocking code transmitted from the mobile device by:
  receiving a blocking request including the blocking code from the mobile device, the blocking code including user information about a user of the mobile device;
  verifying the blocking code by analyzing the user information and the blocking code; and
  transmitting a response generated based on a result of the verification to the mobile device, the response indicating whether to block the operation of the at least one element function corresponding to the blocking code,
generating an unblocking code using a combination of the user information and the blocking code; and
unblocking the operation of the blocked element function using the unblocking code.

8. The method of claim 7, wherein the blocking code is a code used by the mobile device to block the operation of the at least one element function in an area in which a user is located.

9. The method of claim 8, wherein the area is a building.

10. The method of claim 8, wherein the blocking code is configured such that different blocking codes are used for multiple areas.

11. The method of claim 7, wherein the server generates the unblocking code to be unique to the mobile device or a user of the mobile device.

12. The method of claim 7, wherein the user information includes a user identifier.

13. The method of claim 12, wherein verifying the blocking code comprises determining whether the blocking code matches a purpose of a visit of the user, recorded on the server using the user identifier.

14. The method of claim 7, wherein:
the user information includes information about a position of the mobile device, and
verifying the blocking code comprises determining whether the blocking code matches the position.

15. The method of claim 7, wherein unblocking the operation comprises:
  receiving an unblocking request for the blocking from the mobile device;
  determining whether to permit the unblocking; and
  transmitting a response indicating whether to perform the unblocking based on a result of the determination to the mobile device.

16. The method of claim 15, wherein:
the request includes information about a position of the mobile device, and
determining whether to permit the unblocking comprises determining whether the position is in an area appropriate for the unblocking.

17. The method of claim 7, further comprising providing an alarm to the mobile device when the blocking code is not transmitted from the mobile device.

* * * * *